Dec. 15, 1970 TETSUO TOKITA ET AL 3,548,248

MISCONVERGENCE COMPENSATION FOR SINGLE GUN, PLURAL BEAM TYPE COLOR TV PICTURE TUBE

Filed July 8, 1968

INVENTORS
TETSUO TOKITA
SENRI MIYAOKA
BY
[signature]
ATTORNEY

United States Patent Office 3,548,248

Patented Dec. 15, 1970

3,548,248

MISCONVERGENCE COMPENSATION FOR SINGLE GUN, PLURAL BEAM TYPE COLOR TV PICTURE TUBE

Tetsuo Tokita, Tokyo, and Senri Miyaoka, Kanagawa-ken, Japan, assignors to Sony Corporation, Tokyo, Japan, a corporation of Japan Filed July 8, 1968, Ser. No. 743,222
Claims priority, application Japan, July 19, 1967, 42/46,252
Int. Cl. H01j 29/50
U.S. Cl. 315—13 4 Claims

ABSTRACT OF THE DISCLOSURE

In a single gun, plural beam type color television picture tube, electron beams representing different color signals are focused by a single lens, after which two of the beams diverge. They must then be reconverged by convergence deflecting electrodes in order to cross at a common point upon a beam-selecting grid from which the beams diverge to impinge on respective color phosphors representing a color picture element. To compensate for misconvergence, at least one pair of the convergence deflection electrodes has an adjustable static convergence deflecting voltage as well as a fixed or adjustable dynamic deflecting voltage applied thereto so that different convergence deflecting voltages may be applied to the different pairs of convergence deflection electrodes operating on the two different color representing electron beams.

FIELD OF THE INVENTION

This invention relates generally to circuitry for color television picture tubes. It particularly concerns a circuit which compensates for misconvergence in a color picture tube of the single-gun, plural-beam type.

THE PRIOR ART

A single-gun, plural beam color picture tube has been proposed, for example, as disclosed specifically in the copending U.S. application Ser. No. 697,414, filed Jan. 12, 1968, and having a common assignee herewith, in which three different cathodes producing three different electron beams, one for each of the primary colors. The cathodes are arranged in a horizontal row, so that the three electron beams start out side-by-side. Shortly after leaving the gun, however, the three beams cross at a common point at the center of a single electrostatic lens which serves to focus all three beams upon a color screen. After leaving the focusing lens, the three electron beams diverge. The center beam continues in a straight line, but the two beams on either side diverge sidewardly and must therefore be reconverged by pairs of convergence deflection electrodes, to which a convergence deflection voltage is applied. This causes all three beams to cross at a common point where they pass through a beam-selecting grid, after which they again diverge to impinge on the respective color phosphors constituting a color picture element on the color screen.

It has been found, however, that certain refinements are required to make the convergence deflection system just described produce the desired accuracy of convergence, without sacrificing color picture quality and resolution. For one thing, the convergence relationships vary as a function of the horizontal sweep position of the three beams at any given moment. Accordingly, it has been proposed to apply to the pairs of convergence deflection electrodes a dynamic convergence deflection voltage, synchronized with the flyback signal so as to match the horizontal sweep rate, which is superimposed upon a static convergence deflection voltage to provide a dynamically compensated resultant convergence effect.

However, there still remains the ever-present possibility of small manufacturing inaccuracies, even within the allowed tolerances, which cause one pair of convergence deflecting electrodes to be spaced apart a somewhat different distance relative to the spacing of the other pair. When this happens, if the same static and/or dynamic convergence deflection voltages are applied to both pairs of electrodes, that voltage dropped across a somewhat different electrode spacing will necessarily result in a different voltage gradient. These different voltage gradients at the two pairs of electrodes will cause the two beams to be deflected somewhat differently, and this in turn produces a misconvergence directly traceable to such manufacturing inaccuracies.

Still another problem arises, particularly in those color television picture tubes which are built with a short neck so as to be accommodated within a relatively shallow television set cabinet. Such tubes are commonly designed with the convergence deflection electrodes within the evacuated interior of the tube neck telescoped into the raster deflection magnetic yoke on the exterior of the tube neck, so as to achieve the desired spatial economy. As a result, however, the influence of the magnetic raster deflection yoke upon the convergence deflection electrodes causes a D.C. eddy current to circulate through the center electrode of the convergence deflection structure. The effect of this eddy current, in turn, is to produce a magnetic deflection of the electron beams which makes its own contribution to misconvergence thereof.

SUMMARY AND OBJECTS OF THE INVENTION

For these reasons, the present invention has as its objective the provision of a means for compensating for misconvergence of the electron beams, regardless of its cause, so that picture quality and resolution are preserved despite concessions made to manufacturing tolerances and/or magnetic influences arising from shortening the neck of the picture tube to permit its accommodation in a shallow TV cabinet.

In a color picture tube of the kind described above, the present invention provides first and second distinct sources of at least the static convergence deflecting voltage connected for respective energization of the two convergence deflecting electrode pairs. At least one of these distinct sources is selectively adjustable so as to apply a value of static convergence deflecting voltage to one of the convergence deflecting electrode pairs which is different from the value of such voltage applied by the other source to the other convergence deflecting electrode pair. As a result, despite the inaccuracy in the deflection of the electron beams, the convergence deflection voltage applied to one beam can be manually adjusted to produce the exact deflection necessary to converge properly with the other beam.

If a dynamic convergence deflection voltage is also employed, first and second isolating capacitors may be used to connect the two pairs of convergence deflection electrodes respectively to the dynamic convergence deflection voltage source, so as to avoid a short circuit between the two different static convergence deflection potentials.

If desired, moreover, dynamic misconvergence arising from the same causes discussed above can also be compensated by providing two distinct sources of dynamic convergence voltage, connecting one of these sources through a first capacitor to a first set of convergence deflecting electrodes, and connecting the second dynamic convergence deflection voltage to the other set of convergence deflecting electrodes through the second capacitor.

The two different sources of either static or dynamic convergence deflection voltage may comprise a generator with a potentiometer shunted across its output, one deflection voltage level being taken across the entire potentiometer, and the other being taken from the adjustable tap.

BRIEF DESCRIPTION OF THE DRAWING

The same reference characters refer to the same elements throughout the several views of the drawings.

DETAILED DESCRIPTION OF THE ILLUSTRATED EMBODIMENTS

Figure 1:
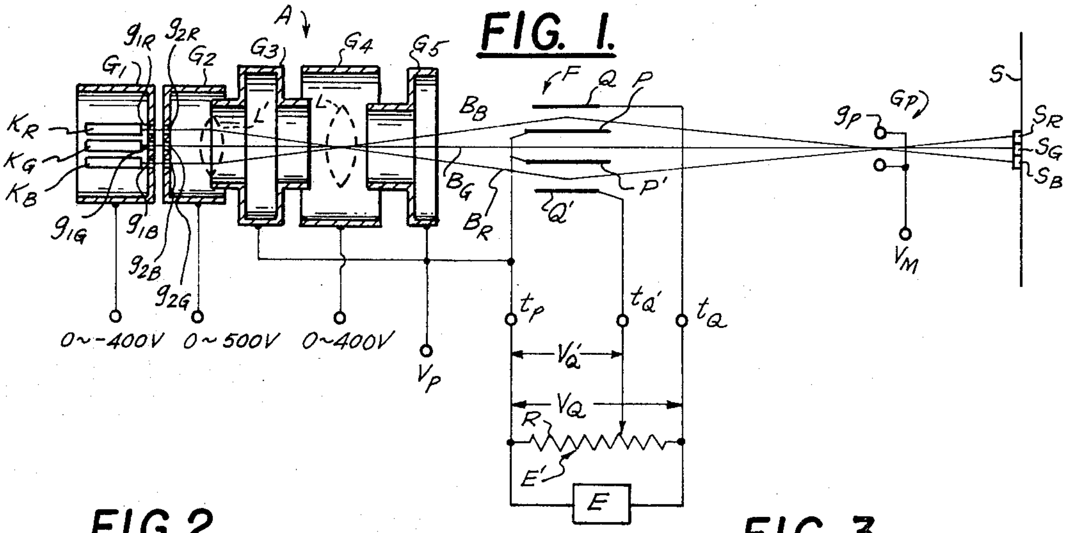
FIG. 1 is a schematic diagram looking down upon a picture tube, and showing the electron ballistics of a single-gun, plural-beam type color picture tube, together with a static convergence deflection voltage circuit adapted to compensate for misconvergence in accordance with this invention.

In FIG. 1, the reference character A generally designates a color television picture tube of the single-gun, plural-beam type. The single gun of this tube comprises three cathodes $K_R$, $K_G$, and $K_B$, which produce the electron beams $B_R$, $B_G$, and $B_B$ for the red, green and blue signals, respectively. The three beams, after leaving their respective cathodes, pass through respective apertures $g_{1R}$, $g_{1G}$, $g_{1B}$ formed in a first grid $G_1$. Then they proceed through corresponding respective apertures $g_{2R}$, $g_{2G}$, $g_{2B}$ formed in a second grid $G_2$. The apertures of the grids $G_1$ and $G_2$ serve the conventional beam-forming function. As the electron beams leave the second grid $G_2$, they then pass through three open-ended tubular grids or electrodes $G_3$, $G_4$, and $G_5$, in that order. The grid $G_2$ and electrode $G_3$ cooperate to define a relatively weak auxiliary lens L′ by which the parallel beams are made to converge at the optical center of a lens L defined by electrodes $G_3$, $G_4$, and $G_5$ and which serves to focus all three beams upon the phosphor screen S on the faceplate of the tube.

After the three beams $B_B$, $B_G$, and $B_R$ leave focusing lens L, center beam $B_G$ continues in a straight line coincident with optical axis of such lens and beams $B_B$ and $B_R$, however, diverge from the center beam. Accordingly, convergence deflecting electrodes generally designated F are provided for the purpose of converging the outer beams to cross at a common spot with the center beam so that all three pass through the same aperture between individual wires $g_P$ of the beam-selecting grid or mask $G_P$. Thereafter, the beams again diverge so that the red signal beam $B_R$ goes on to strike the red phosphor stripe $S_R$, the blue signal beam $B_B$ goes on to strike the blue phosphor stripe $S_B$ and the green signal beam $B_G$ goes on to strike the green phosphor stripe $S_G$ of a common color television picture element.

As indicated in FIG. 1, the first grid $G_1$ may receive a static potential of about 400 volts, the second grid $G_2$ may receive a static potential of about 500 volts, while the center lens element $G_4$ may receive a potential of about 400 volts. The two outer lens elements $G_3$ and $G_5$ are connected to a potential $V_P$ which is at or near the anode potential (13 to 20 kv.) of the tube. The first grid $G_1$ performs the intensity modulation function, and therefore also has a signal voltage impressed thereon. A voltage $V_M$ is applied to the wires $g_P$ of the beam-selecting grid $G_P$.

Moreover, in the conventional manner, the electron beams are swept horizontally and vertically across screen S to produce the usual cathode ray tube raster. In the view of FIG. 1, the electron beams $B_B$, $B_G$, and $B_R$ are swept from one extremity of the screen S to its other extremity. The horizontal and vertical deflections necessary to produce the picture raster are of course accomplished by conventional deflection yokes, not illustrated in the present drawings, mounted outside the neck of the picture tube A.

In order to converge the electron beams, the convergence deflection electrodes F comprise outer electrodes or plates Q and Q′, and inner electrodes or plates P and P′ which are spaced from each other and respectively spaced inwardly from the plates Q and Q′. The inner electrodes P and P′ are maintained at a higher potential than either of the outer electrodes Q and Q′. Since the electrodes P and P′ are of the same potential, the green signal beam $B_G$ is not deflected in passing therebetween. The blue signal beam $B_B$ passes between the outer electrode Q and the inner electrode P, while the red signal beam $B_R$ passes between the outer electrode Q′ and the inner electrode P′. Accordingly, the divergent beams $B_B$ and $B_R$ are deflected inwardly by the respective voltage gradients between their respective pairs of electrodes Q, P and Q′, P′, to converge with beam $B_G$ at a common point at the beam-selecting grid $G_P$.

In order to maintain the necessary high potential upon the inner electrodes P and P′, the latter are connected jointly to a terminal $t_P$, which in turn may be connected to the highest potential of the tube, i.e., the anode voltage $V_P$.

In order to maintain the outer electrodes Q and Q′ at a somewhat lower potential than the inner electrodes P and P′, a suitable generator or voltage source E is provided which generates a static convergence deflection voltage. This generator has its high side connected to terminal $t_P$, and its low side connected to the outer convergence deflection electrodes Q and Q′ so that the latter are at the required lower potential.

In previously proposed circuits, both of the outer electrodes Q and Q′ were connected to the same convergence deflection potential produced by generator E. As a result, whenever the spacing between the electrodes Q and P operating upon the blue electron beam $B_B$ happened to be different from the spacing between the other set of electrodes Q′ and P′ operating on the red electron beam $B_R$, the application of the same potential to both the outer electrodes Q and Q′ resulted in a different voltage gradient between electrodes Q and P, compared to the voltage gradient between electrodes Q′ and P′. Since the two beams $B_B$ and $B_R$ were influenced by different voltage gradients for convergence deflection purposes, they were differentially deflected, with resulting adverse affects on proper convergence at the beam-selecting grid $G_P$.

In accordance with the present invention, one of the electrodes Q is brought out to a terminal $t_Q$ and the other is brought out to a distinct terminal $t_Q'$, so that different static convergence deflection voltages $V_Q$ and $V_Q'$ may be applied to these terminals, and thus to the outer electrodes Q and Q′, respectively. In addition, at least one of the voltages $V_Q$ or $V_Q'$ is preferably adjustable relative to the other so that the deflection imposed upon one of the beams $B_B$ or $B_R$ is adjustable relative to the deflection imposed upon the other, whereby misconvergence due to manufacturing inaccuracies can be corrected.

Another effect which this circuit can compensate for arises from the fact that the inner electrodes P and P′ are connected together to be at the same voltage and therefore avoid deflection of the center beam $B_G$. The physical realization of the electrodes illustrated diagrammatically as P and P′ in the present drawings, is a pair of metal plates joined together mechanically and electrically by metal struts, in effect forming a box-like configuration of metal parts. For use in shallow TV cabinets, color television picture tubes are often made with short necks which require telescoping of the convergence deflection electrodes F within the magnetic raster deflection yoke on the outside of the neck. When this is done, the magnetic field of the vertical deflection yoke causes a D.C. eddy current to flow around the complete path provided by the box-like configuration of the inner electrodes P and P'. This circulating current, in turn, results in a field which causes an undesired magnetic deflection of the central beam $B_G$ laterally toward the plate P or the plate P' so that the central beam does not intersect the beams $B_R$ and $B_B$ as the point of convergence of the latter beams on grid $G_P$. However, with the circuit of the present invention, the convergence deflecting voltage applied to one of the outer electrodes Q or Q' can be adjusted to vary the deflection of the respective beams $B_R$ or $B_B$ and to cause the beams to converge properly at a common point.

One particular way of providing two distinct voltages $V_Q$ and $V_Q'$, one of which is adjustable, is to provide a potentiometer R, the entire resistance of which is shunted across the output of the generator E. The particular one of the outer convergence deflection electrodes Q or Q' which happens to require the greater convergence deflection potential difference between itself and its corresponding inner electrode P or P', is connected to the end point of the potentiometer. The other electrode Q or Q' which requires a smaller convergence deflection potential difference between itself and its associated inner electrode P or P', is connected to the adjustable tap of the potentiometer. In the specific example illustrated in FIG. 1, it is assumed that for proper convergence compensation the convergence deflection potential between electrodes Q and P must be somewhat greater than the convergence deflection potential between the other set of electrodes Q' and P'. Accordingly, terminal $t_Q$ is connected to the end point of the potentiometer, while terminal $t_Q'$ is connected to the adjusable tap thereof. The other end point of the potentiometer is connected to terminal $t_P$. Accordingly, the full output of the generator E represents the larger potential difference $V_Q$ applied between the set of electrodes Q and P, while the portion of the potentiometer connected between terminals $t_P$ and $t_Q'$ is in effect an auxiliary generator E' which provides a smaller potential difference $V_Q'$ across the other set of electrodes Q' and P'. The latter voltage is of course adjustable by means of the potentiometer R to tune out misconvergence arising as described above.

In single-gun, plural-beam type color picture tubes of the described type, the convergence deflection imposed upon the beams $B_B$ and $B_R$ by the electrodes F has to vary as a function of the instantaneous position of the electron beams in their horizontal sweep motion. In order to achieve this, it has been proposed to employ a dynamic convergence deflection voltage which is superimposed upon the static deflection voltage and applied therewith to the same convergence deflection electrodes F, for example, as disclosed specifically in co-pending U.S. application Ser. No. 718,730, filed Apr. 4, 1968, and having a common assignee herewith. The dynamic convergence deflection voltage is derived from a generator G (FIG. 2) which develops a varying voltage synchronized with the horizontal sweep in order to correct convergence deflection deviations as a function of such sweep.

Figure 2:
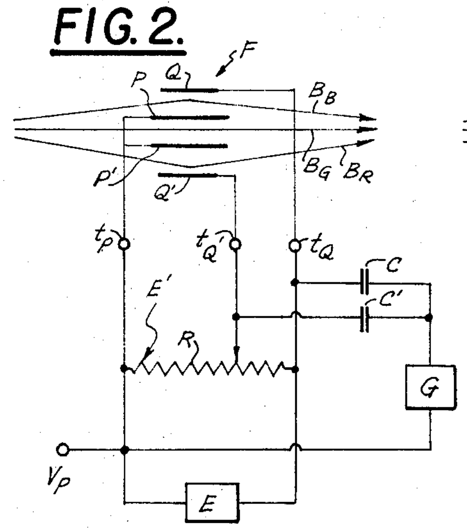
FIG. 2 is a similar diagram schematically showing the convergence deflection electrodes of the picture tube of FIG. 1, together with a static convergence deflecting voltage circuit adjustable in accordance with this invention, and a circuit for superimposing thereon a fixed dynamic convergence deflection voltage.

In the context of the present invention, however, in which the outer convergence deflectional electrodes Q and Q' have different static convergence deflection potentials thereon, these electrodes cannot both be connected directly, i.e., they cannot be D.C. coupled, to the same source of dynamic convergence deflection voltage, generator G in FIG. 2. If they were, this would create a short circuit across the static convergence deflection potential difference between electrodes Q and Q'. Accordingly, in order to achieve D.C. isolation, the dynamic convergence deflection potential generator G is connected through respective capacitors C and C' to the two outer convergence deflection electrodes Q and Q' respectively. This enables the same dynamic convergence deflection signal to be superimposed upon the different static convergence deflection potential levels of these electrodes. The other side of the dynamic convergence deflection potential generator G is connected to the inner convergence deflection electrodes P and P'.

The circuit of FIG. 2 is employed with color television picture systems wherein the level of picture quality desired, and the differences in convergence deflection observed between the electrode pairs P, Q and P', Q' are such that only static misconvergence compensation is required. In some situations, however, it may be advisable to also provide dynamic misconvergence compensation by applying different levels of dynamic convergence deflection voltage to the outer convergence deflection electrodes Q and Q'.

Figure 3:
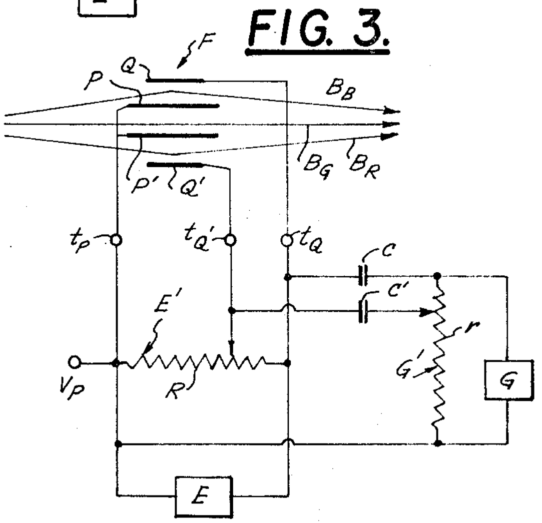
FIG. 3 is a view similar to that of FIG. 2, but showing an embodiment of the invention having a convergence deflection voltage circuit in which the static and dynamic components thereof are both adjustable to compensate for misconvergence.

In such instances, the circuit of FIG. 3 may be employed. There the dynamic convergence deflection voltage generator G has a potentiometer *r*, the entire resistance of which is shunted across its output. Then, assuming that outer convergence deflection electrode Q is the one which requires a greater dynamic convergence potential difference relative to its paired inner electrode P, that electrode would be connected through capacitor C to the end point of the potentiometer *r*. The other outer convergence deflection electrode Q', requiring a smaller dynamic convergence deflection potential difference relative to its paired inner electrode P', would be connected through its isolating capacitor C' to the adjustable tap of the potentiometer *r*. Once again, capacitors C and C' provide D.C. isolation. With this type of connection, the full output voltage of the generator G is applied across the electrodes Q and P, while the smaller, adjustable level of dynamic convergence deflection voltage developed at the adjustable tap of the potentiometer *r* is applied across the other pair of convergence deflection electrodes Q' and P'. In effect, the portion of the potentiometer *r* between its adjustable tap and its lower end in FIG. 3, is an auxiliary generator G'.

Figure 4:
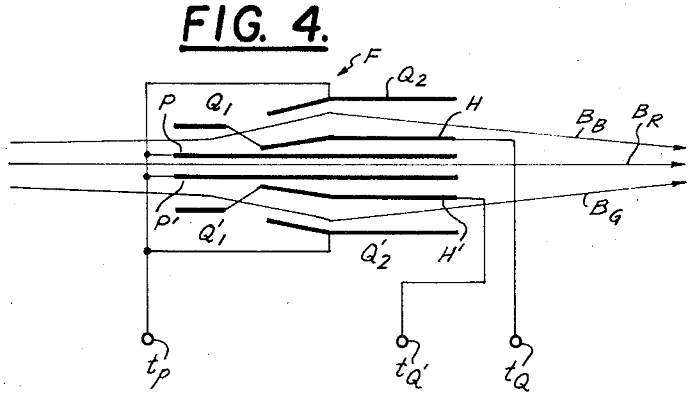
FIG. 4 is a similar diagrammatic view showing another arrangement of convergence deflecting electrodes that can be operated with the circuits of FIGS. 2 or 3.

In the embodiments of the invention described above with reference to FIGS. 1, 2, and 3, the convergence deflection has been affected by two pairs of plates or electrodes. However, the invention can also be applied to convergence deflection arrangements in which the beams emerging from the focusing lens along paths divergent with respect to the optical axis are first deflected further outwardly from the central beam and deflected inwardly so as to again converge with the central beam at relatively large angles with respect to the latter, for example, as disclosed specifically in copending U.S. application Ser. No. 718,738, filed Apr. 4, 1968, and having a common assignee herewith. Convergence deflection arrangements of the last mentioned type, for example, as shown on FIG. 4, may comprise center electrodes P and P' again constituted by a pair of parallel plates similar to those of the previous figures, and being connected to terminal $t_P$ to receive the anode potential $V_P$ of the tube. The outer convergence deflection electrodes, however, in this arrangement comprise a pair of outer plates $Q_2$ and $Q_2'$ which may be longitudinally curved, as shown, and are also connected to terminal $t_P$ and the anode potential of the tube. In addition, there is another set of convergence deflection electrodes $Q_1$ and $Q_1'$. It is these electrodes which are connected in the manner of the outer covergence deflection electrodes Q and Q' of the preceding figures, namely to terminals $t_Q$ and $t_Q'$ respectively. These terminals would of course receive the respective differing static and/or dynamic covergence deflection potentials for misconvergence correction, all as described above. In this electrode configuration the convergence deflection electrodes $Q_1$ and $Q_1'$ are electrically connected to an additional set of plates H and H' which longitudinally follow electrodes $Q_1$ and $Q_1'$ and are situated between the inner electrodes P and P', and the outermost electrodes $Q_2$ and $Q_2'$. The electrode configuration of FIG. 4 serves first to spread or outwardly deflect the outer electron beams $B_B$ and $B_G$, and later to converge them more sharply as they continue on toward the beam-selecting mask and the phosphor picture screen.

What is claimed is:

1. In a single-gun, plural-beam, color picture tube which includes a color screen having arrays of different color phosphors, beam-selecting means provided with apertures corresponding respectively to said arrays, beam-generating means for directing a plurality of indivdual electron beams toward said color screen for impingement on respective phosphors of each array through the corresponding aperture, single lens means for focusing said electron beams on said color screen and having an optical center substantially through which said beams are all passed with at least a first and a second of said beams being angled with respect to the optical axis of said lens means to enter the latter along paths that are convergent to said optical axis and to emerge from said lens means along paths divergent to said axis, and at least first and second electron beam convergence deflecting means interposed between said lens means and said beam selecting means and being operative respectively to deflect said first and second beams independently of each other for convergence of said beams at an aperture of said beam-selecting means; the improvement comprising first and second distinct sources of convergence deflection voltage connected for respectively energizing said first and second convergence deflecting means, at least one of said sources being selectively adjustable to provide a value of convergence deflection voltage to one of said convergence deflecting means which is different from the value thereof provided by said other source to said other convergence deflecting means, whereby to compensate for misconvergence; each of said sources applies a corresponding static convergence deflection voltage to the respective convergence deflecting means, and there is further provided means for applying dynamic convergence deflection voltages to said convergence deflecting means, and first and second isolating means connecting said dynamic convergence voltages to said first and second convergence deflecting means respectively whereby to avoid a short-circuit between the different static convergence deflection voltages thereon.

2. A tube according to claim 1 wherein said first and second convergence deflection voltage sources comprise a static convergence deflection voltage generator having an output providing at least part of one of said convergence deflection voltages, and a potentiometer including a resistance shunted across said generator output, and a tap adjustable upon said resistance to obtain as selected fractional voltage output providing said different convergence deflection voltage.

3. A tube according to claim 1 wherein there are at at least two distinct sources of said dynamic convergence deflection voltages, at least one of said dynamic convergence deflection voltage sources is selectively adjustable to provide a value of dynamic convergence voltage which is different from the value thereof provided by said other dynamic convergence deflection voltage source, said first isolating capacitor connects a first one of said dynamic convergence deflection voltage sources to said first convergence deflecting means, and said second isolating capacitor connects a second one of said dynamic convergence deflection voltage source to said second covergence deflecting means.

4. A tube according to claim 3 wherein said two dynamic convergence deflection voltage sources comprise a dynamic convergence deflection voltage generator having an output providing one of said dynamic convergence deflection voltages, and a potentiometer including a resistance shunted across said generator output and a tap adjustable upon said resistance to obtain a selected fractional voltage output providing said different dynamic convergence deflection voltage.

References Cited

UNITED STATES PATENTS

| | | |
|---|---|---|
| 2,679,614 | 5/1954 | Friend. |
| 2,903,622 | 9/1959 | Schopp. |
| 2,907,915 | 10/1959 | Gleichauf. |
| 2,975,325 | 3/1961 | Gundert et al. |

RODNEY D. BENNETT, Jr., Primary Examiner

M. F. HUBLER, Assistant Examiner